United States Patent
Kwon et al.

(10) Patent No.: US 10,826,129 B2
(45) Date of Patent: Nov. 3, 2020

(54) ELECTRODE FOR SECONDARY BATTERY, METHOD FOR MANUFACTURING SAME, SECONDARY BATTERY COMPRISING SAME, AND CABLE-TYPE SECONDARY BATTERY

(71) Applicant: LG Chem, Ltd., Seoul (KR)

(72) Inventors: Yo-Han Kwon, Daejeon (KR); In-Sung Uhm, Daejeon (KR); Je-Young Kim, Daejeon (KR); Suk-In Noh, Daejeon (KR)

(73) Assignee: LG Chem, Ltd. (KR)

( * ) Notice: Subject to any disclaimer, the term of this patent is extended or adjusted under 35 U.S.C. 154(b) by 305 days.

(21) Appl. No.: 15/321,460

(22) PCT Filed: Oct. 30, 2015

(86) PCT No.: PCT/KR2015/011589
§ 371 (c)(1),
(2) Date: Dec. 22, 2016

(87) PCT Pub. No.: WO2016/068651
PCT Pub. Date: May 6, 2016

(65) Prior Publication Data
US 2017/0222278 A1    Aug. 3, 2017

(30) Foreign Application Priority Data

Oct. 31, 2014 (KR) .................. 10-2014-0150754
Oct. 31, 2014 (KR) .................. 10-2014-0150760
(Continued)

(51) Int. Cl.
*H01M 2/16*    (2006.01)
*H01M 10/42*   (2006.01)
(Continued)

(52) U.S. Cl.
CPC ..... *H01M 10/4235* (2013.01); *H01M 2/0275* (2013.01); *H01M 2/1673* (2013.01);
(Continued)

(58) Field of Classification Search
CPC ............ H01M 4/36–366; H01M 2/14; H01M 2/16–1686
See application file for complete search history.

(56) References Cited

U.S. PATENT DOCUMENTS 5,770,331 A * 6/1998 Olsen .................. H01M 2/0215
                                                        429/153
6,200,706 B1 * 3/2001 Ashida .................... D04H 1/54
                                                        429/247
(Continued)

FOREIGN PATENT DOCUMENTS

CN    101071860 A    11/2007
CN    103891025 A    6/2014
(Continued)

OTHER PUBLICATIONS

International Search Report from PCT/KR2015/011589, dated Jun. 3, 2016.
(Continued)

*Primary Examiner* — Jonathan G Leong
(74) *Attorney, Agent, or Firm* — Lerner, David, Littenberg, Krumholz & Mentlik, LLP

(57) ABSTRACT

The present invention relates to a sheet-type electrode for a secondary battery, a method for manufacturing the same, a secondary battery comprising the same, and a cable-type secondary battery, the electrode comprising: a sheet-type electrode stacked body comprising a collector, an electrode active material formed on a surface of the collector, and a porous first support layer formed on the electrode active
(Continued)

material; and a sealing layer formed so as to surround the entire side surface of the electrode stacked body.

18 Claims, 15 Drawing Sheets

(30) Foreign Application Priority Data

Oct. 31, 2014 (KR) .................. 10-2014-0150766
Oct. 31, 2014 (KR) .................. 10-2014-0150767

(51) Int. Cl.
| | |
|---|---|
| *H01M 10/058* | (2010.01) |
| *H01M 10/04* | (2006.01) |
| *H01M 4/36* | (2006.01) |
| *H01M 4/13* | (2010.01) |
| *H01M 2/02* | (2006.01) |
| *H01M 4/525* | (2010.01) |
| *H01M 4/587* | (2010.01) |
| *H01M 4/14* | (2006.01) |
| *H01M 10/12* | (2006.01) |
| *H01M 10/36* | (2010.01) |
| *H01M 10/28* | (2006.01) |
| *H01M 4/24* | (2006.01) |

(52) U.S. Cl.
CPC .............. *H01M 4/13* (2013.01); *H01M 4/366* (2013.01); *H01M 4/525* (2013.01); *H01M 4/587* (2013.01); *H01M 10/04* (2013.01); *H01M 10/0431* (2013.01); *H01M 10/058* (2013.01); *H01M 4/14* (2013.01); *H01M 4/24* (2013.01); *H01M 10/12* (2013.01); *H01M 10/28* (2013.01); *H01M 10/36* (2013.01)

(56) References Cited

U.S. PATENT DOCUMENTS

| | | | |
|---|---|---|---|
| 7,399,322 B2 * | 7/2008 | Yu ........................ | H01M 2/1653 29/623.5 |
| 2012/0244423 A1 * | 9/2012 | Kusukawa ........ | H01M 10/0585 429/178 |
| 2013/0236766 A1 | 9/2013 | Seo et al. | |
| 2014/0170453 A1 | 6/2014 | Kwon et al. | |
| 2014/0170455 A1 | 6/2014 | Kwon et al. | |
| 2014/0178726 A1 * | 6/2014 | Kwon ..................... | H01M 4/70 429/94 |
| 2014/0220400 A1 | 8/2014 | Kwon et al. | |
| 2014/0234732 A1 | 8/2014 | Park et al. | |
| 2014/0255741 A1 | 9/2014 | Kwon et al. | |
| 2014/0255742 A1 | 9/2014 | Kwon et al. | |

FOREIGN PATENT DOCUMENTS

| | | | | |
|---|---|---|---|---|
| CN | 104067418 A | 9/2014 | | |
| EP | 2770559 A1 | 8/2014 | | |
| JP | 08-088019 A | 4/1996 | | |
| JP | 2012099385 A | 5/2012 | | |
| JP | 2014160656 A | 9/2014 | | |
| JP | 2014203740 A | 10/2014 | | |
| KR | 20080010166 A | 1/2008 | | |
| KR | 20120046091 A | 5/2012 | | |
| KR | 20130014223 A | 2/2013 | | |
| KR | 20130045220 A | 5/2013 | | |
| KR | 20140070936 A | 6/2014 | | |
| KR | 20140076158 A | 6/2014 | | |
| KR | 101440939 B1 | 9/2014 | | |
| WO | WO-2013055188 A1 * | 4/2013 | .............. | H01M 4/70 |

OTHER PUBLICATIONS

Supplementary European Search Report for EP3139426 dated Dec. 22, 2017.

* cited by examiner

ELECTRODE FOR SECONDARY BATTERY, METHOD FOR MANUFACTURING SAME, SECONDARY BATTERY COMPRISING SAME, AND CABLE-TYPE SECONDARY BATTERY

CROSS-REFERENCE TO RELATED APPLICATIONS

This application is a national phase entry under 35 U.S.C. § 371 of International Application No. PCT/KR2015/011589, filed Oct. 30, 2015, which claims priority to Korean Patent Application Nos. 10-2014-0150754, 10-2014-0150760, 10-2014-0150766 and 10-2014-0150767 filed on Oct. 31, 2014 with the Korean Intellectual Property Office, the disclosures of which are incorporated herein by reference in their entirety.

TECHNICAL FIELD

The present disclosure relates to an electrode for a secondary battery, a method for manufacturing the same, and a secondary battery and a cable-type secondary battery comprising the same, and more particularly, to an electrode for a secondary battery with improved battery flexibility while preventing delamination of an electrode active material layer, a method for manufacturing the same, and a secondary battery and a cable-type secondary battery comprising the same.

BACKGROUND ART

Recently, a secondary battery is a device that stores electrical energy in chemical form and converts the stored chemical energy into electrical energy to generate electricity when needed. The secondary battery is also referred to as a rechargeable battery because it can be recharged repeatedly. A common secondary battery includes a lead accumulator, a NiCd battery, a NiMH accumulator, a Li-ion battery, and a Li-ion polymer battery. When compared to a disposable primary battery, not only is the secondary battery more economically efficient, it is also more environmentally friendly.

A secondary battery is currently used in applications requiring low electric power, for example, equipment used to assist with starting a vehicle, a mobile device, a tool, and an uninterruptible power supply. Recently, as the development of wireless communication technology has been leading to the popularization of mobile devices and even to the mobilization of many types of existing devices, the demand for a secondary battery has been dramatically increasing. A secondary battery is also used in an environmentally friendly next-generation vehicle such as a hybrid vehicle or an electric vehicle to reduce the cost and weight and to increase the service life of the vehicle.

Generally, most secondary batteries have a cylindrical, prismatic, or pouch shape. This is associated with a fabrication process of a secondary battery that mounts an electrode assembly composed of a negative electrode, a positive electrode, and a separator in a cylindrical or prismatic metal can or a pouch-shaped case of an aluminum laminate sheet, and injects an electrolyte into the electrode assembly. Because a predetermined mounting space for the secondary battery is necessary in this process, the cylindrical, prismatic or pouch shape of the secondary battery is a limitation in developing various shapes of mobile devices. Accordingly, there is a need for a new type of secondary battery that is easily adaptable in shape.

To meet the need, suggestions have been made to develop a cable-type secondary battery having a very high ratio of length to cross-sectional diameter. A cable-type secondary battery may have a capacity reduction and deterioration in cycle life characteristics when delamination of an electrode active material layer occurs due to stress caused by an external force in the event of shape deformation or rapid volume expansion of the electrode active material layer during charge/discharge.

To solve the problem, if the binder content in the electrode active material layer is increased, flexibility against bending or twisting will be provided. However, the increased binder content in the electrode active material layer increases the electrode resistance, causing battery performance degradation. Further, if a strong external force enough to completely fold an electrode is applied, delamination of the electrode active material layer cannot be avoided even though the increased binder content is present. This method is not a good solution.

DISCLOSURE

Technical Problem

Therefore, the present disclosure is directed to providing an electrode for a secondary battery that may impede cracks in an electrode active material layer even if an external force is applied to the electrode active material layer, and that may prevent the delamination from a current collector even if cracking is serious, a method for manufacturing the same, and a secondary battery and a cable-type secondary battery comprising the same.

Technical Solution

To achieve the object, according to an aspect of the present disclosure, there is provided a sheet-type electrode for a secondary battery including a sheet-type electrode stacked body including a current collector, an electrode active material layer formed on one surface of the current collector, and a porous first support layer formed on the electrode active material layer; and a sealing layer formed around an entire side surface of the electrode stacked body.

Here, the sealing layer may be formed of a polymer including any one selected from the group consisting of high-density polyethylene, linear low-density polyethylene, low-density polyethylene, ultra-high molecular weight polyethylene, polypropylene, polybutylene, polypentene, polyethylene terephthalate, polybutylene terephthalate, polyester, polyacetal, polyamide, polycarbonate, polyimide, polyether ether ketone, polyether sulfone, polyphenylene oxide, polyphenylene sulfide, polyvinylidene fluoride, polyvinylidene fluoride-co-hexafluoro propylene, polyvinylidene fluoride-co-trichloroethylene, polybutyl acrylate, polymethyl methacrylate, polyacrylonitrile and polyethylene naphthalate, or mixtures thereof.

Also, the electrode for a secondary battery may further include a conductive layer including a conductive material and a binder, an organic-inorganic porous layer including inorganic particles and a binder polymer, or a porous polymer layer, between the electrode active material layer and the porous first support layer.

Also, the current collector may be made of stainless steel, aluminum, nickel, titanium, sintered carbon or copper; stainless steel surface-treated with carbon, nickel, titanium or silver; an aluminum-cadmium alloy; a non-conductive polymer surface-treated with a conductive material; a conductive polymer; a metal paste including metal powder of Ni, Al, Au, Ag, Pd/Ag, Cr, Ta, Cu, Ba or ITO; or a carbon paste including carbon powder of graphite, carbon black or carbon nanotubes.

Also, the current collector may be a mesh-type current collector.

Also, the current collector may further include a primer coating layer formed of a conductive material and a binder.

Here, the conductive material may include any one selected from the group consisting of carbon black, acetylene black, ketjen black, carbon fibers, carbon nanotubes and graphene, or mixtures thereof.

Also, the binder may be any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or mixtures thereof.

Also, a plurality of recesses may be formed on at least one surface of the current collector.

In this instance, the plurality of recesses may have a continuous pattern or an intermittent pattern.

Also, the porous first support layer may be a mesh-type porous membrane or a non-woven fabric.

Also, the porous first support layer may be formed of any one selected from the group consisting of high-density polyethylene, low-density polyethylene, linear low-density polyethylene, ultra-high molecular weight polyethylene, polypropylene polyethyleneterephthalate, polybutyleneterephthalate, polyester, polyacetal, polyamide, polycarbonate, polyimide, polyether ether ketone, polyether sulfone, polyphenylene oxide, polyphenylene sulfide and polyethylenenaphthalate, or mixtures thereof.

Also, the electrode for a secondary battery may further include a conductive material coating layer including a conductive material and a binder, on the porous first support layer.

In this instance, the conductive material coating layer may include the conductive material and the binder mixed at a weight ratio of from 80:20 to 99:1.

Here, the conductive material may include any one selected from the group consisting of carbon black, acetylene black, ketjen black, carbon fibers, carbon nanotubes and graphene, or mixtures thereof.

Also, the binder may be any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or mixtures thereof.

On the other hand, the electrode for a secondary battery may further include a porous coating layer formed of a mixture of inorganic particles and a binder polymer, on the porous first support layer.

Also, the electrode for a secondary battery may further include a second support layer formed on the other surface of the current collector.

In this instance, the second support layer may be a polymer film, and the polymer film may be formed of any one selected from the group consisting of polyolefin, polyester, polyimide and polyamide, or mixtures thereof.

On the other hand, in case that the electrode for a secondary battery is a negative electrode, the electrode active material layer may include active material particles of any one selected from the group consisting of natural graphite, artificial graphite or a carbonaceous material; lithium-containing titanium composite oxide (LTO), metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof, and in case that the electrode for secondary battery is a positive electrode, the electrode active material layer may include active material particles of any one selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which $0 \leq x < 0.5$, $0 \leq y < 0.5$, $0 \leq z < 0.5$, $0 < x+y+z \leq 1$), or mixtures thereof.

Also, the sheet-type electrode for a secondary battery may have a strip structure extending in one direction.

On the other hand, according to the present disclosure, there is provided a sheet-type electrode for a secondary battery, including a sheet-type electrode stacked body including a current collector, an electrode active material layer formed on one surface of the current collector, and a support layer formed on the other surface of the current collector; and a sealing layer formed around an entire side surface of the electrode stacked body.

On the other hand, according to another aspect of the present disclosure, there is provided a method for manufacturing a sheet-type electrode for a secondary battery, including (S1) applying an electrode active material slurry to one surface of a current collector; (S2) forming a porous first support layer on the applied electrode active material slurry; (S3) compressing a result of the step (S2) to form an electrode active material layer integrated between the current collector and the first support layer by adhesion, producing a sheet-type electrode stacked body; and (S4) forming a sealing layer around an entire side surface of the electrode stacked body.

Here, the electrode active material slurry may include a binder component.

In this instance, the step (S2) may include, before the binder component is cured, forming the porous first support layer on the applied electrode active material slurry.

Also, the step (S3) may include, before the binder component is cured, compressing a result of the step (S2) through a coating blade to form an electrode active material layer integrated between the current collector and the porous first support layer by adhesion.

Also, the method may further include, before the step (S1) or between the step (S3) and the step (S4), forming a second support layer on the other surface of the current collector by compression.

Also, according to another aspect of the present disclosure, there is provided a secondary battery including a positive electrode, a negative electrode, a separator interposed between the positive electrode and the negative electrode, and an electrolyte, wherein at least one of the positive electrode and the negative electrode is the electrode for a secondary battery of the present disclosure.

On the other hand, according to another aspect of the present disclosure, there is provided a cable-type secondary battery including an inner electrode; a separation layer formed around an outer surface of the inner electrode to prevent a short circuit in electrodes; and an outer electrode formed such that it is spirally wound around an outer surface of the separation layer, wherein at least one of the inner electrode and the outer electrode is formed of the electrode for a secondary battery of the present disclosure.

In this instance, the outer electrode may have a strip structure extending in one direction.

Also, the outer electrode may be formed such that it is spirally wound in non-overlapping turns, or overlapping turns.

Also, the inner electrode may have a hollow structure in which a space is formed inside.

In this instance, the inner electrode may include at least one electrode for a secondary battery wound spirally.

Also, an inner electrode current collector core, a lithium ion supplying core including an electrolyte, or a filling core may be formed in the space formed within the inner electrode.

In this instance, the lithium ion supplying core may further include a gel-type polymer electrolyte and a support, and may further include a liquid electrolyte and a porous carrier.

On the other hand, the electrolyte may include an electrolyte selected from a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP); a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc).

Also, the electrolyte may further include a lithium salt, and in this instance, the lithium salt may be any one selected from the group consisting of LiCl, LiBr, LiI, $LiCO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate and lithium tetraphenylborate, or mixtures thereof.

On the other hand, the inner electrode may be a negative electrode or a positive electrode, and the outer electrode may be a positive electrode or a negative electrode opposing the inner electrode.

Also, the separation layer may be an electrolyte layer or a separator.

In this instance, the electrolyte layer may include an electrolyte selected from a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc).

Also, the electrolyte layer may further include a lithium salt, and the lithium salt may be any one selected from the group consisting of LiCl, LiBr, LiI, $LiCO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate and lithium tetraphenylborate, or mixtures thereof.

Also, the separator may be a porous polymer substrate made of a polyolefin-based polymer selected from the group consisting of ethylene homopolymer, propylene homopolymer, ethylene-butene copolymer, ethylene-hexene copolymer and ethylene-methacrylate copolymer; a porous polymer substrate made of a polymer selected from the group consisting of polyester, polyacetal, polyamide, polycarbonate, polyimide, polyether ether ketone, polyether sulfone, polyphenylene oxide, polyphenylene sulfide and polyethylene naphthalate; a porous substrate formed of a mixture of inorganic particles and a binder polymer; or a separator with a porous coating layer formed of a mixture of inorganic particles and a binder polymer on at least one surface of the porous polymer substrate.

On the other hand, according to another aspect of the present disclosure, there is provided a cable-type secondary battery including a lithium ion supplying core including an electrolyte; an inner electrode formed around an outer surface of the lithium ion supplying core, and including a current collector and an electrode active material layer; a separation layer formed around an outer surface of the inner electrode to prevent a short circuit in electrodes; and an outer electrode formed such that it is spirally wound around an outer surface of the separation layer, and including a current collector and an electrode active material layer, wherein at least one of the inner electrode and the outer electrode is formed of the electrode for a secondary battery of the present disclosure.

On the other hand, according to another aspect of the present disclosure, there is provided a cable-type secondary battery including at least two inner electrodes arranged in parallel; a separation layer formed around outer surfaces of the inner electrodes together to prevent a short circuit in electrodes; and an outer electrode formed such that it is spirally wound around an outer surface of the separation layer, wherein at least one of the inner electrode and the outer electrode is formed of the electrode for a secondary battery of the present disclosure.

Also, according to another aspect of the present disclosure, there is provided a cable-type secondary battery including at least two lithium ion supplying cores including an electrolyte; at least two inner electrodes arranged in parallel and formed around an outer surface of each lithium ion supplying core, and including a current collector and an electrode active material layer; a separation layer formed around outer surfaces of the inner electrodes together to prevent a short circuit in electrodes; and an outer electrode formed such that it is spirally wound around an outer surface of the separation layer, and including a current collector and an electrode active material layer, wherein at least one of the inner electrode and the outer electrode is formed of the electrode for secondary battery of the present disclosure.

In this instance, the inner electrode may include at least one electrode for a secondary battery wound spirally.

On the other hand, according to the present disclosure, there is provided a cable-type secondary battery including an inner electrode; and an outer electrode formed such that it is spirally wound around an outer surface of the inner electrode, wherein the outer electrode is the above-described electrode for a secondary battery of the present disclosure, and the porous first support layer prevents a short circuit in the inner electrode and the outer electrode.

Also, there is provided a cable-type secondary battery electrolyte including a lithium ion supplying core including an electrolyte; an inner electrode formed around an outer surface of the lithium ion supplying core; and an outer electrode formed such that it is spirally wound around an outer surface of the inner electrode, wherein at least one of the inner electrode and the outer electrode is the above-described electrode for a secondary battery of the present disclosure, and the porous first support layer prevents a short circuit in the inner electrode and the outer electrode.

Advantageous Effects

According to the present disclosure, the flexibility of the electrode may be greatly improved by introducing the support layer on at least one surface of the sheet-type electrode.

Also, when a strong external force enough to completely fold the electrode is applied, even though the binder content in an electrode active material layer is not increased, the support layer serves as a buffer to impede cracks in the electrode active material layer, and consequently, prevent the delamination of the electrode active material layer from the current collector.

Thereby, reductions in battery capacity can be prevented and cycle life characteristics of the battery can be improved.

Further, the porous support layer provided may allow an electrolyte solution to smoothly flow into the electrode active material layer, and when the electrolyte solution is infiltrated into the pores of the porous support layer, can prevent increases in internal resistance of the battery and degradation in battery performance.

Also, the inclusion of the sealing layer formed around the entire side surface of the sheet-type electrode except the top and bottom surfaces can prevent a short circuit that may occur when the side surfaces of the sheet-type electrode are exposed.

BRIEF DESCRIPTION OF THE DRAWINGS

The accompanying drawings illustrate preferred embodiments of the present disclosure and, together with the foregoing disclosure, serve to provide further understanding of the technical aspects of the present disclosure. However, the present disclosure is not to be construed as being limited to the drawings.

Figure 1:
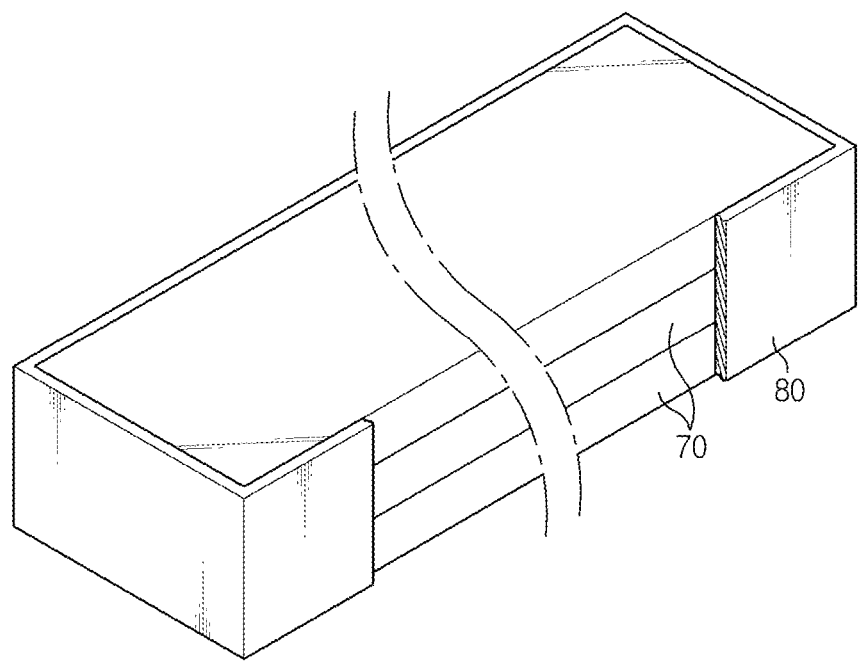
FIG. 1 is a perspective view of a sheet-type electrode for a secondary battery according to an embodiment of the present disclosure.

| [Description of Reference Numerals] | |
|---|---|
| 10: Current collector | 20: Electrode active material layer |
| 20': Electrode active material slurry | 30: First support layer |
| 40: Second support layer | 50: Coating blade |
| 70: Sheet-type electrode stacked body | 80: Sealing layer |
| 100, 200: Cable-type secondary battery | |
| 110, 210: Lithium ion supplying core | |
| 120, 220: Inner current collector | |
| 130, 230: Inner electrode active material layer | |
| 140, 240: First support layer | |
| 150, 250: Second support layer | |
| 160, 260: Separation layer | |
| 170, 270: Outer electrode active material layer | |
| 180, 280: Outer current collector | |
| 190, 290: Protective coating | |

MODE FOR CARRYING OUT THE INVENTION

Hereinafter, the present disclosure will be described in detail with reference to the accompanying drawings. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Also, embodiments described herein and illustrations shown in the drawings are just one most preferred example of the present disclosure, not intended to represent all the technical aspects of the present disclosure, so it should be understood that various equivalents and variations would be made thereto as alternatives at the time the present application is filed.

Figure 2:
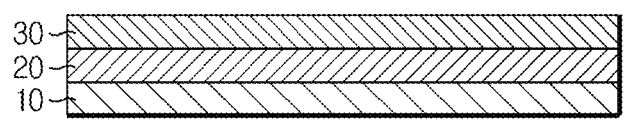
FIG. 2 is a diagram showing a cross section of a sheet-type electrode stacked body according to an embodiment of the present disclosure.
Figure 3:
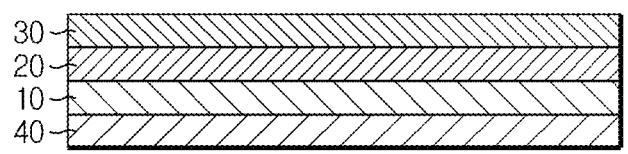
FIG. 3 is a diagram showing a cross section of a sheet-type electrode stacked body according to another embodiment of the present disclosure.
Figure 4:
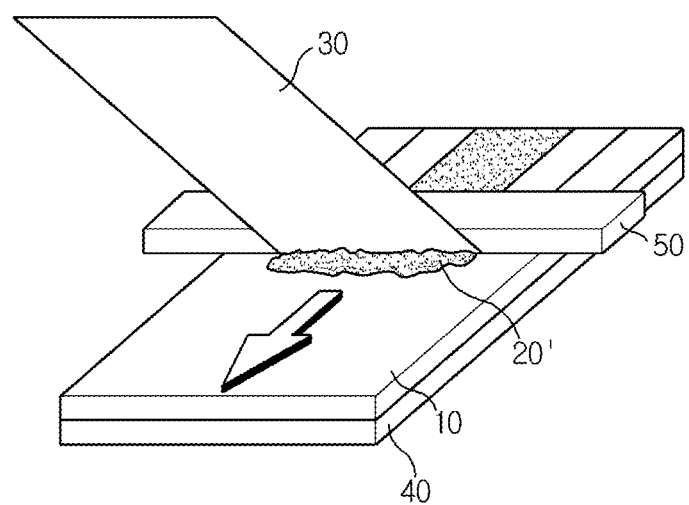
FIG. 4 is an outline diagram showing a method for manufacturing a sheet-type electrode for a secondary battery according to an embodiment of the present disclosure.

FIG. 1 is a perspective view of a sheet-type electrode for a secondary battery according to an embodiment of the present disclosure, FIGS. 2 and 3 are diagrams showing a cross section of a sheet-type electrode stacked body according to an embodiment of the present disclosure, and FIG. 4 is an outline diagram showing a preferred method for manufacturing a sheet-type electrode for a secondary battery according to an embodiment of the present disclosure.

Hereinafter, referring to FIGS. 1 through 4, the sheet-type electrode for a secondary battery according to the present disclosure includes a sheet-type electrode stacked body 70 including a current collector 10, an electrode active material layer 20 formed on one surface of the current collector 10, and a porous first support layer 30 formed on the electrode active material layer 20, and a sealing layer 80 formed around the entire side surface of the electrode stacked body 70.

Also, additionally, the sheet-type electrode stacked body 70 may further include a second support layer 40 formed on the other surface of the current collector 10.

To fabricate a flexible battery, it is necessary to ensure sufficient flexibility of an electrode. However, a traditional cable-type secondary battery as one example of a flexible battery has capacity reductions and deterioration in cycle life characteristics of the battery when delamination of an electrode active material layer occurs due to stress caused by an external force in the event of shape deformation or rapid volume expansion of the electrode active material layer during charge/discharge in case that a high capacity negative electrode active material such as Si and Sn based materials is applied. To overcome the problem, if the binder content in the electrode active material layer is increased, flexibility against bending or twisting will be provided.

However, the increased binder content in the electrode active material layer increases the electrode resistance, causing battery performance degradation, and, if a strong external force enough to completely fold the electrode is applied, delamination of the electrode active material layer cannot be avoided even though the increased binder content is present, failing to present a good solution.

In this circumstance, the present disclosure solved the problem by including the porous first support layer 30 formed on the outer surface of the electrode, and the second support layer 40 that may be formed on the other surface of the current collector 10.

That is, when an external force such as bending or twisting is applied to the electrode, the porous first support layer 30 serves as a buffer to mitigate the external force applied to the electrode active material layer 20, thereby preventing delamination of the electrode active material layer 20, and improving the flexibility of the electrode. Also, the second support layer 40 may prevent a short circuit in the current collector 10 and further improve the flexibility of the current collector 10.

Further, if the side surfaces of the sheet-type electrode for a secondary battery are exposed, a short circuit may occur due to the contact with an electrode of opposite polarity when an external force is applied to the battery such as a cable-type secondary battery. However, the present disclosure includes the sealing layer 80 formed around the entire side surface of the sheet-type electrode except the top and bottom surfaces, and thus can prevent a short circuit that may occur when the side surfaces of the sheet-type electrode are exposed.

In this instance, the sealing layer 80 acts as an insulator and may be formed of a polymer that does not react with lithium ions. A non-limiting example of the polymer includes high-density polyethylene, linear low-density polyethylene, low-density polyethylene, ultra-high molecular weight polyethylene, polypropylene, polybutylene, polypentene, polyethyleneterephthalate, polybutyleneterephthalate, polyester, polyacetal, polyamide, polycarbonate, polyimide, polyether ether ketone, polyether sulfone, polyphenylene oxide, polyphenylene sulfide, polyvinylidene fluoride, polyvinylidene fluoride-co-hexafluoro propylene, polyvinylidene fluoride-co-trichloroethylene, polybutyl acrylate, polymethyl methacrylate, polyacrylonitrile, and polyethylene naphthalate.

Here, the sheet-type electrode for a secondary battery may have a strip structure extending in one direction.

On the other hand, according to another aspect of the present disclosure, there is provided a sheet-type electrode for a secondary battery including a sheet-type electrode stacked body including a current collector, an electrode active material layer formed on one surface of the current collector, and a support layer formed on the other surface of the current collector; and a sealing layer formed around the entire side surface of the electrode stacked body.

On the other hand, the electrode for a secondary battery according to the present disclosure may further include a conductive layer which is obtained by drying a conductive material slurry including a conductive material and a binder, as an adhesive between the electrode active material layer and the porous first support layer so that they are integrated by adhesion.

When a general binder is applied as the adhesive, it acts as resistance to the electrode, causing the battery performance to degrade, but this problem can be solved by including the conductive layer to increase the conductivity of the electrode, and an electrolyte solution can move freely through the pore structure of the conductive layer.

Also, the electrode for a secondary battery according to the present disclosure may further include an organic-inorganic porous layer which is obtained by drying an organic-inorganic mixed slurry including inorganic particles and a binder polymer, as an adhesive between the electrode active material layer and the porous first support layer so that they are integrated by adhesion.

If the organic-inorganic porous layer is included as the adhesive in place of a general binder, a porous structure is formed, allowing for enhanced permeation of an electrolyte solution into the electrode active material layer, thereby preventing an increase in electrode resistance.

Also, the electrode for a secondary battery according to the present disclosure may further include a porous polymer layer which is obtained by drying a polymer solution including a polymer, as an adhesive between the electrode active material layer and the porous first support layer so that they are integrated by adhesion.

If the porous polymer layer is included as the adhesive in place of a general binder, a porous structure is formed, allowing for enhanced permeation of an electrolyte solution into the electrode active material layer, thereby preventing an increase in electrode resistance.

Referring to FIGS. 1 through 4, a method for manufacturing the sheet-type electrode for a secondary battery is described. For reference, although FIG. 4 shows that the electrode active material layer is formed in a state in which the second support layer 40 is pre-formed on the lower surface of the current collector 10, this is just an example of the present disclosure, and the electrode active material layer may be formed in a state in which the second support layer 40 is not pre-formed, as described below.

First, an electrode active material slurry 20' is applied to one surface of the current collector 10 (S1).

Here, the current collector 10 acts to collect electrons generated by electrochemical reactions of an electrode active material or to supply electrons required for electrochemical reactions, and may be made of stainless steel, aluminum, nickel, titanium, sintered carbon or copper; stainless steel surface-treated with carbon, nickel, titanium or silver; an aluminum-cadmium alloy; a non-conductive polymer surface-treated with a conductive material; a conductive polymer; a metal paste including metal powder of Ni, Al, Au, Ag, Pd/Ag, Cr, Ta, Cu, Ba or ITO; or a carbon paste including carbon powder of graphite, carbon black or carbon nanotubes.

If an external force such as bending or twisting is applied to the secondary battery as described above, delamination of the electrode active material layer from the current collector may occur. Thus, for the flexibility of the electrode, a large amount of binder components are included in the electrode active material layer. However, such a large amount of binders are prone to fall off from the current collector due to swelling occurred by an electrolyte solution, causing the battery performance to degrade.

Accordingly, to improve adhesion between the electrode active material layer and the current collector, the current collector 10 may further include a primer coating layer formed of a conductive material and a binder. In this instance, the conductive material and the binder may be of the same type as those used to form a conductive material coating layer as described below.

Figure 5:
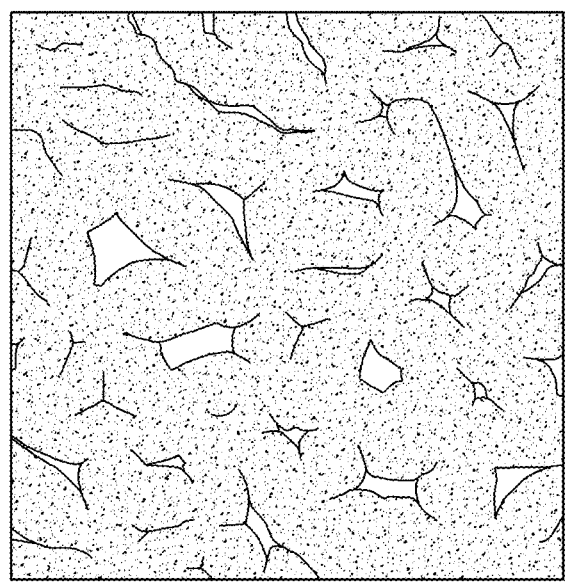
FIG. 5 is a diagram showing the surface of a mesh-type current collector according to an embodiment of the present disclosure.
Figure 6:
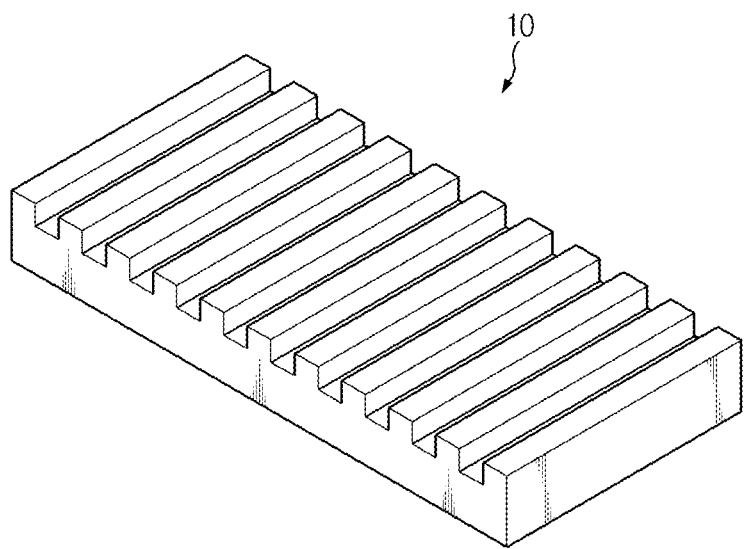
FIG. 6 is an outline diagram showing a surface of a current collector having a plurality of recesses according to an embodiment of the present disclosure.
Figure 7:
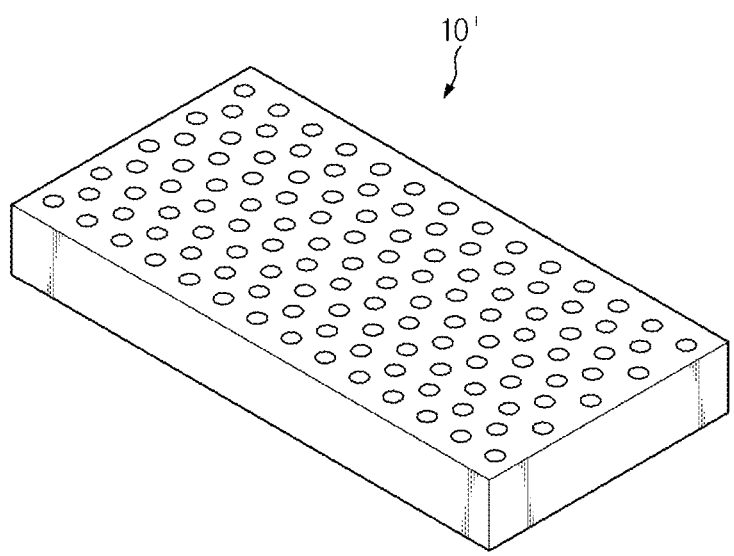
FIG. 7 is an outline diagram showing a surface of a current collector having a plurality of recesses according to another embodiment of the present disclosure.

Also, referring to FIGS. 5 through 7, the current collector 10 may be a mesh-type current collector, and to further increase the surface area of the current collector, a plurality of recesses may be formed on at least one surface. In this instance, the plurality of recesses may have a continuous pattern or an intermittent pattern. That is, recesses may be formed in continuous patterns along the lengthwise direction, spaced apart from each other, or multiple holes may be formed in intermittent patterns. The multiple holes may be circular or polygonal in shape.

Subsequently, the porous first support layer 30 is formed on the applied electrode active material slurry 20' (S2).

Here, the first support layer 30 may be a mesh-type porous membrane or a non-woven fabric. By having this porous structure, permeation of an electrolyte solution into the electrode active material layer 20 is enhanced, and the first support layer 30 itself into which an electrolyte solution is infiltrated very well, which ensures ionic conductivity, thereby preventing increases in internal resistance of the battery and deterioration in battery performance.

Also, the first support layer 30 may be formed of any one selected from the group consisting of high-density polyethylene, low-density polyethylene, linear low-density polyethylene, ultra-high molecular weight polyethylene, polypropylene, polyethyleneterephthalate, polybutyleneterephthalate, polyester, polyacetal, polyamide, polycarbonate, polyimide, polyether ether ketone, polyether sulfone, polyphenylene oxide, polyphenylene sulfide and polyethylenenaphthalate, or mixtures thereof.

On the other hand, a conductive material coating layer including a conductive material and a binder may be further included on the first support layer 30. The conductive material coating layer improves the conductivity of the electrode active material layer and reduces the electrode resistance, and as a consequence, prevents the degradation in battery performance.

In the case of a negative electrode, because conductivity of a negative electrode active material layer is relatively high, a negative electrode with no conductive material coating layer shows similar performance to the case where a general negative electrode is used, while in the case of a positive electrode, because conductivity of a positive electrode active material layer is low, performance degradation caused by increases in electrode resistance may become more serious, so it is specially advantageous when applied to a positive electrode with an aim of reducing the internal resistance of the battery.

In this instance, the conductive material coating layer may be formed of the conductive material and the binder mixed at a weight ratio of from 80:20 to 99:1. When the binder content increases, the electrode resistance may excessively increase, but when the content satisfies the above numerical range, an excessive increase in the electrode resistance is prevented. Further, because the first support layer serves as a buffer to prevent delamination of the electrode active material layer as described above, the presence of the binder does not have great difficulties in ensuring the flexibility of the electrode because the binder is present in a relatively small amount.

In this instance, the conductive material may include, but is not limited to, any one selected from the group consisting of carbon black, acetylene black, ketjen black, carbon fibers, carbon nanotubes and graphene, or mixtures thereof.

Also, the binder may include, but is not limited to, any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or mixtures thereof.

Figure 8:
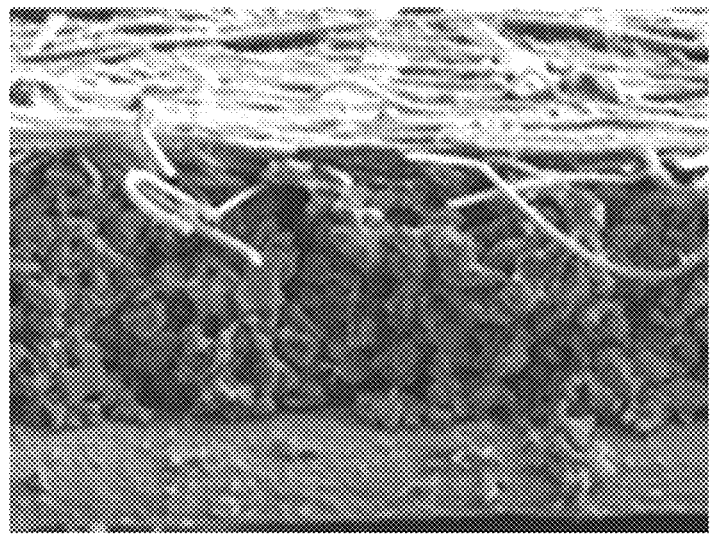
FIG. 8 is a scanning electron microscope (SEM) image showing a cross section of a sheet-type electrode for a secondary battery manufactured according to an embodiment of the present disclosure.

Subsequently, a result of the step (S2) is compressed to form the electrode active material layer 20 integrated between the current collector 10 and the first support layer 30 by adhesion, producing the sheet-type electrode stacked body 70 (S3). FIG. 8 is a SEM image showing the cross section of the electrode for a secondary battery manufactured according to an embodiment of the present disclosure.

On the other hand, if the electrode active material slurry 20' is coated on one surface of the current collector 10 and dried to form the electrode active material layer 20 and the first support layer 30 is formed thereon, for example, via lamination, strong adhesion between the electrode active material layer 20 and the first support layer 30 may not be maintained as the binder component in the electrode active material slurry 20' which adheres the two layers is cured.

Also, without using the porous first support layer pre-formed as in the preferred manufacturing method of the present disclosure, a porous support layer may be formed by coating a polymer solution on the electrode active material layer. However, the porous support formed by coating the polymer solution has poorer mechanical properties than the porous first support layer manufactured by the preferred manufacturing method of the present disclosure, and thus cannot effectively impede delamination of the electrode active material layer caused by an external force.

However, according to the preferred manufacturing method of the present disclosure, before the binder component is cured, the first support layer 30 is formed on the upper surface of the applied electrode active material slurry 20' and compressed through a coating blade 50 to form the electrode active material layer 20 integrated between the current collector 10 and the first support layer 30 by adhesion.

On the other hand, in case that the electrode for a secondary battery is a negative electrode, the electrode active material layer 20 may include active material particles of any one selected from the group consisting of natural graphite, artificial graphite or a carbonaceous material; lithium-containing titanium composite oxide (LTO), metals (Me) including Si, Sn, Li, Zn, Mg, Cd, Ce, Ni or Fe; alloys consisting of the metals (Me); oxides (MeOx) of the metals (Me); and composites of the metals (Me) and carbon, or mixtures thereof, and in case that the electrode for a secondary battery is a positive electrode, the electrode active material layer 20 may include active material particles of any one selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg and Mo, and x, y and z are each independently atomic fractions of elements in an oxide composition, in which $0 \leq x < 0.5$, $0 \leq y < 0.5$, $0 \leq z < 0.5$, $0 < x+y+z \leq 1$), or mixtures thereof.

Subsequently, the sealing layer 80 is formed around the entire side surface of the electrode stacked body 70 (S4).

On the other hand, before the step (S1) or between the step (S3) and the step (S4), the method may further include forming the second support layer 40 on the other surface of the current collector 10 by compression. Here, the second support layer 40 can prevent disconnection in the current collector 10, and thereby further improve the flexibility of the current collector 10.

In this instance, the second support layer 40 may be a polymer film, and in this instance, the polymer film may be formed of any one selected from the group consisting of polyolefin, polyester, polyimide and polyamide, or mixtures thereof.

On the other hand, a method for manufacturing a sheet-type electrode for a secondary battery according to another embodiment of the present disclosure includes (S1) applying an electrode active material slurry on one surface of a current collector and drying to form an electrode active material layer; (S2) applying a conductive material slurry including a conductive material and a binder to the electrode active material layer; (S3) forming a porous first support layer on the applied conductive material slurry; (S4) compressing a result of the step (S3) to form a conductive layer integrated between the electrode active material layer and the porous first support layer by adhesion, producing a sheet-type electrode stacked body; and (S5) forming a sealing layer around the entire side surface of the electrode stacked body.

In this instance, the conductive layer improves the conductivity of the electrode and thus prevents degradation in battery performance. Also, the conductive layer may be formed by mixing the conductive material with the binder at a weight ratio of from 1:10 to 8:10.

The conductive material and the binder used here may be of the same type as those used for the conductive material coating layer as described above.

Also, the conductive layer may have a porous structure to allow for enhanced permeation of an electrolyte solution into the electrode active material layer, and in this instance, the size of the pores formed in the conductive layer may be from 0.01 μm to 5 μm, and the porosity may be from 5 to 70%.

Figure 9:
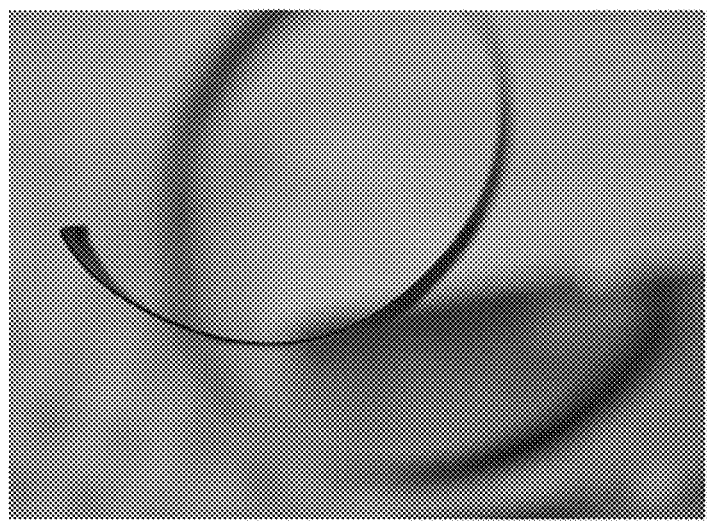
FIG. 9 is a photographic image showing an electrode for a secondary battery manufactured according to an embodiment of the present disclosure.

FIG. 9 is a photographic image showing an electrode for a secondary battery manufactured according to an embodiment of the present disclosure.

On the other hand, if the conductive material slurry is coated on one surface of the electrode active material layer and dried to form a conductive layer and a first support layer is formed thereon, for example, via lamination, strong adhesion between the electrode active material layer and the first support layer may not be maintained as the binder component in the conductive material slurry which adheres the two layers is cured.

Also, without using the porous first support layer pre-formed as in the preferred manufacturing method of the present disclosure, a porous support layer may be formed by coating a polymer solution on the conductive layer. However, the porous support formed by coating the polymer solution has poorer mechanical properties than the porous first support layer manufactured by the preferred manufacturing method of the present disclosure, and thus cannot effectively impede delamination of the electrode active material layer caused by an external force.

However, according to the preferred manufacturing method of the present disclosure, before the binder is cured, the first support layer is formed on the upper surface of the applied conductive material slurry and compressed through a coating blade to form the conductive layer integrated between the electrode active material layer and the first support layer by adhesion.

On the other hand, before the step (S1) or between the step (S4) and the step (S5), the method may further include forming a second support layer on the other surface of the current collector by compression. Here, the second support layer can prevent disconnection in the current collector, and thereby further improve the flexibility of the current collector.

On the other hand, a method for manufacturing a sheet-type electrode for a secondary battery according to another embodiment of the present disclosure includes (S1) applying an electrode active material slurry to one surface of a current collector and drying to form an electrode active material layer; (S2) applying an organic-inorganic mixed slurry including inorganic particles and a binder polymer to the electrode active material layer; (S3) forming a porous first support layer on the applied organic-inorganic mixed slurry; (S4) compressing a result of the step S3 to form an organic-inorganic porous layer integrated between the electrode active material layer and the porous first support layer by adhesion, producing a sheet-type electrode stacked body; and (S5) forming a sealing layer around the entire side surface of the electrode stacked body.

In this instance, the organic-inorganic porous layer may be formed by mixing the inorganic particles with the binder polymer at a weight ratio of from 20:80 to 95:5.

Here, the inorganic particles may be inorganic particles having a dielectric constant higher than or equal to 5, inorganic particles having the ability to transport lithium ions, or mixtures thereof.

The inorganic particles having a dielectric constant higher than or equal to 5 may be any one selected from the group consisting of $BaTiO_3$, $Pb(Zr_x, Ti_{1-x})O_3(PZT, 0<x<1)$, $Pb_{1-x}La_xZr_{1-y}Ti_yO_3(PLZT, 0<x<1, 0<y<1)$, $(1-x)Pb(Mg_{1/3}Nb_{2/3})O_3-xPbTiO_3(PMN-PT, 0<x<1)$, hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $SiO_2$, AlOOH, $Al(OH)_3$ and $TiO_2$, or mixtures thereof.

Also, the inorganic particles having the ability to transport lithium ions may be any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2(Li_xSi_yS_z, 0<x<3, 0<y<2, 0<z<4)$ based glass and $P_2S_5$ ($Li_xP_yS_z$, $0<x<3$, $0<y<3$, $0<z<7$) based glass, or mixtures thereof.

Also, the inorganic particles may have an average particle diameter of from 10 nm to 5 µm.

On the other hand, the binder polymer may be any one selected from the group consisting of polyvinylidene fluoride (PVDF), polyvinylidene fluoride-co-hexafluoro propylene, polyvinylidene fluoride-co-trichloroethylene, polybutyl acrylate, polymethyl methacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer and polyimide, or mixtures thereof, but is not limited thereto.

Also, the organic-inorganic porous layer has a porous structure to allow for enhanced permeation of an electrolyte solution into the electrode active material layer, and the size of the pores formed in the organic-inorganic porous layer may be from 0.01 µm to 10 µm, and the porosity may be from 5 to 95%.

In this instance, the porous structure of the organic-inorganic porous layer may be formed through a phase separation or a phase shift by a non-solvent in the manufacturing process, and may be formed by interstitial volumes between the inorganic particles created by interconnecting and immobilizing the inorganic particles by the binder polymer.

On the other hand, if the organic-inorganic mixed slurry is coated on one surface of the electrode active material layer and dried to form an organic-inorganic porous layer and a first support layer is formed thereon, for example, via lamination, strong adhesion between the electrode active material layer and the first support layer may not be maintained as the binder polymer in the organic-inorganic mixed slurry which adheres the two layers is cured.

Also, without using the porous first support layer preformed as in the preferred manufacturing method of the present disclosure, a porous support layer may be formed by coating a polymer solution on the organic-inorganic porous layer. However, the porous support formed by coating the polymer solution has poorer mechanical properties than the porous first support layer manufactured by the preferred manufacturing method of the present disclosure, and thus cannot effectively impede delamination of the electrode active material layer caused by an external force.

However, according to the preferred manufacturing method of the present disclosure, before the binder polymer is cured, the first support layer is formed on the upper surface of the applied organic-inorganic mixed slurry and compressed through a coating blade to form the organic-inorganic porous layer integrated between the electrode active material layer and the first support layer by adhesion.

On the other hand, before the step (S1) or between the step (S4) and the step (S5), the method may further include forming a second support layer on the other surface of the current collector by compression. Here, the second support layer can prevent disconnection in the current collector, and thereby further improve the flexibility of the current collector.

On the other hand, a method for manufacturing a sheet-type electrode for a secondary battery according to another embodiment of the present disclosure includes (S1) applying an electrode active material slurry to one surface of a current collector, and drying to form an electrode active material layer; (S2) applying a polymer solution including a polymer to the electrode active material layer; (S3) forming a porous first support layer on the applied polymer solution; (S4) compressing a result of the step (S3) to form a porous polymer layer integrated between the electrode active material layer and the porous first support layer by adhesion, producing a sheet-type electrode stacked body; and (S5) forming a sealing layer around the entire side surface of the electrode stacked body.

In this instance, the polymer may be a polar linear polymer, an oxide-based linear polymer, or mixtures thereof.

Here, the polar linear polymer may be any one selected from the group consisting of polyacrylonitrile, polyvinyl chloride, polyvinylidene fluoride, (PVDF), polyvinylidene fluoride-co-hexafluoro propylene, polyvinylidene fluoride-co-trichloroethylene, polyethylene imine, polymethyl methacrylate, polybutyl acrylate, polyvinylpyrrolidone, polyvinylacetate, polyethylene-co-vinyl acetate, polyarylate and poly-p-phenylene terephthalamide, or mixtures thereof.

Also, the oxide-based linear polymer may be any one selected from the group consisting of polyethylene oxide, polypropylene oxide, polyoxymethylene and polydimethylsiloxane, or mixtures thereof.

Also, the porous polymer layer has a porous structure to allow for enhanced permeation of an electrolyte solution into the electrode active material layer, and the size of the pores formed in the porous polymer layer may be from 0.01 µm to 10 µm, and the porosity may be from 5 to 95%.

In this instance, the porous structure of the porous polymer layer may be formed through a phase separation or a phase shift by a non-solvent in the manufacturing process.

For example, a polymer, polyvinylidene fluoride-co-hexafluoropropylene, is added to acetone acting as a solvent, to prepare a solution with 10 wt. % of solids content. Subsequently, 2 to 10 wt. % of water or ethanol as a non-solvent is added to the prepared solution to prepare a polymer solution.

During evaporation of the polymer solution after being coated, a phase shift takes place, and in the phase separated regions of the non-solvent and the polymer, areas occupied by the non-solvent become pores. Accordingly, the size of the pores may be adjusted by the extent to which the polymer is dissolved in the non-solvent and the content of the non-solvent.

Figure 10:
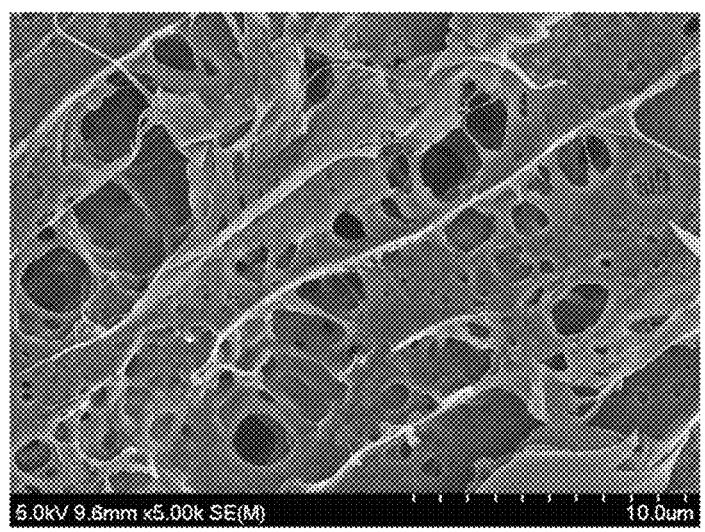
FIG. 10 is a SEM image showing a cross section of a porous polymer layer formed according to an embodiment of the present disclosure.

FIG. 10 is a SEM image showing a cross section of a porous polymer layer formed according to an embodiment of the present disclosure.

On the other hand, when the polymer solution is coated on one surface of the electrode active material layer and dried to form a porous polymer layer, and a first support layer is formed thereon, for example, via lamination, strong adhesion between the adhesion between the electrode active material layer and the first support layer may not be maintained as the binder component in the polymer solution which adheres the two layers is cured.

Also, without using the porous first support layer preformed as in the preferred manufacturing method of the present disclosure, a porous support layer may be formed by coating a polymer solution on the porous polymer layer. However, the porous support formed by coating the polymer solution has poorer mechanical properties than the porous first support layer manufactured by the preferred manufacturing method of the present disclosure, and thus cannot effectively impede delamination of the electrode active material layer caused by an external force.

However, according to the preferred manufacturing method of the present disclosure, before the binder component is cured, the first support layer is formed on the upper surface of the applied polymer solution and compressed through a coating blade to form the porous polymer layer integrated between the electrode active material layer and the first support layer by adhesion.

On the other hand, before the step (S1) or between the step (S4) and the step (S5), the method may further include forming a second support layer on the other surface of the current collector by compression. Here, the second support layer can prevent disconnection in the current collector and thereby further improve the flexibility of the current collector.

On the other hand, the secondary battery of the present disclosure includes a positive electrode, a negative electrode, a separator interposed between the positive electrode and the negative electrode, and an electrolyte, wherein at least one of the positive electrode and the negative electrode is the above-described electrode for a secondary battery of the present disclosure.

Here, the secondary battery of the present disclosure may be not only a secondary battery with a general shape such as stack type, a wound type, and a stack/folding type, but also a secondary battery with a special shape such as a cable-type secondary battery.

On the other hand, a cable-type secondary battery according to the present disclosure includes an inner electrode; a separation layer formed around the outer surface of the inner electrode to prevent a short circuit in electrodes; and an outer electrode formed such that it is spirally wound around the outer surface of the separation layer, wherein at least one of the inner electrode and the outer electrode is formed of the above-described electrode for a secondary battery.

Here, the term spiral, also known as a helix, refers to a curve that turns in a twisting shape within a predetermined range, and collectively represents shapes similar to the shape of a general spring.

In this instance, the outer electrode may have a strip structure extending in one direction.

Also, the outer electrode may be spirally wound in non-overlapping turns. In this instance, the outer electrode may be spirally wound in non-overlapping turns, each turn spaced apart with a gap that is twice or less as large as the width of the outer electrode, to prevent any battery performance degradation.

Also, the outer electrode may be spirally wound in overlapping turns. In this instance, to prevent an excessive increase in the internal resistance of the battery, the outer electrode may be spirally wound such that the width of an overlapping part is 0.9 times or less as large as the width of the outer electrode.

On the other hand, the inner electrode may have a hollow structure in which a space is formed inside.

In this instance, the inner electrode may include at least one electrode for a secondary battery wound spirally.

Also, in the space formed within the inner electrode, an inner electrode current collector core may be formed.

In this instance, the inner electrode current collector core may be made of carbon nanotubes, stainless steel, aluminum, nickel, titanium, sintered carbon or copper; stainless steel surface-treated with carbon, nickel, titanium or silver; an aluminum-cadmium alloy; a non-conductive polymer surface-treated with a conductive material; or a conductive polymer.

Also, in the space formed within the inner electrode, a lithium ion supplying core including an electrolyte may be formed.

In this instance, the lithium ion supplying core may include a gel-type polymer electrolyte and a support.

Also, the lithium ion supplying core may include a liquid electrolyte and a porous carrier.

Furthermore, in the space formed within the inner electrode, a filling core may be formed.

In addition to materials for forming the inner electrode current collector core and the lithium ion supplying core as described above, the filling core may be formed of materials for improving various aspects of the performance of the cable-type secondary battery, for example, polymer resin, rubber, and inorganic materials in various shapes such as a wire, a fiber, powder, a mesh, and a foam.

Figure 11:
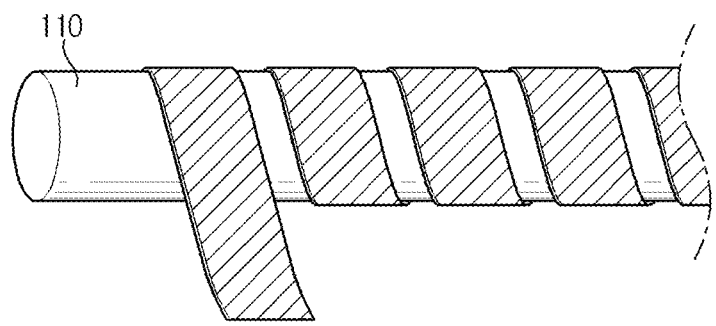
FIG. 11 is an outline diagram showing a cable-type secondary battery of the present disclosure, in which a sheet-type inner electrode is formed such that it is wound on the outer surface of a lithium ion supplying core.

On the other hand, FIG. 11 is an outline diagram showing a cable-type secondary battery according to an embodiment of the present disclosure in which a sheet-type inner electrode is formed such that it is wound on the outer surface of a lithium ion supplying core 110, and it shows the application of a sheet-type inner electrode to a cable-type secondary battery, which is the same as a method by which a sheet-type outer electrode is formed such that it is wound on the outer surface of a separation layer as described below.

The cable-type secondary battery according to an embodiment of the present disclosure includes a lithium ion supplying core including an electrolyte; an inner electrode formed around the outer surface of the lithium ion supplying core and including a current collector and an electrode active material layer; a separation layer formed around the outer surface of the inner electrode to prevent a short circuit in electrodes; and an outer electrode formed such that it is spirally wound around the outer surface of the separation layer and including a current collector and an electrode active material layer, wherein at least one of the inner electrode and the outer electrode is formed of the electrode for a secondary battery of the present disclosure.

The cable-type secondary battery according to an embodiment of the present disclosure may have a horizontal cross section in a predetermined shape, and have a linear structure elongating in the lengthwise direction with regard to the horizontal cross section. The cable-type secondary battery according to an embodiment of the present disclosure may have flexibility and thus free shape adaptability. Here, the predetermined shape is not limited to a particular shape, and includes any shape that does not detract from the nature of the present disclosure.

Figure 12:
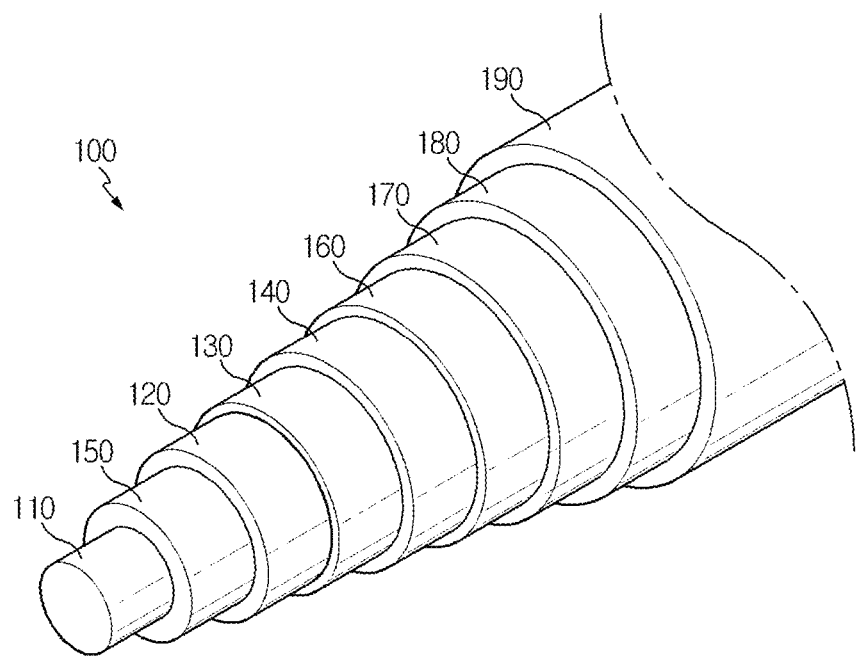
FIG. 12 is an outline exploded perspective view showing the inside of a cable-type secondary battery according to an embodiment of the present disclosure.

In the cable-type secondary battery, FIG. 12 shows a cable-type secondary battery 100 in which the above-described electrode for a secondary battery according to an embodiment of the present disclosure is introduced to an inner electrode.

Referring to FIG. 12, the cable-type secondary battery 100 includes a lithium ion supplying core 110 including an electrolyte; an inner electrode formed such that it is wound around the outer surface of the lithium ion supplying core 110; a separation layer 160 formed around the outer surface of the inner electrode to prevent a short circuit in electrodes; and an outer electrode formed such that it is spirally wound around the outer surface of the separation layer 160 and including an outer current collector 180 and an outer electrode active material layer 170, wherein the inner electrode includes an inner current collector 120, an inner electrode active material layer 130 formed on one surface of the inner current collector 120, a porous first support layer 140 formed on the upper surface of the inner electrode active material layer 130, and a second support layer 150 formed on the other surface of the inner current collector 120.

As described above, the outer electrode rather than the inner electrode may be the above-described sheet-type electrode for a secondary battery of the present disclosure, and both the inner electrode and the outer electrode may include the sheet-type electrode for a secondary battery of the present disclosure.

Here, the lithium ion supplying core 110 includes an electrolyte, and the electrolyte is not limited to a particular type and may include a non-aqueous electrolyte solution using ethylene carbonate (EC), propylene carbonate (PC), butylene carbonate (BC), vinylene carbonate (VC), diethyl carbonate (DEC), dimethyl carbonate (DMC), ethyl methyl carbonate (EMC), methyl formate (MF), γ-butyrolactone (γ-BL), sulfolane, methylacetate (MA), or methylpropionate (MP); a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc). The electrolyte may further include a lithium salt, and the lithium salt preferably includes LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate. Also, the lithium ion supplying core 110 may consist only of an electrolyte, and in the case of a liquid electrolyte solution, may be formed using a porous carrier.

On the other hand, the inner electrode may be a negative electrode or a positive electrode, and the outer electrode may be a positive electrode or a negative electrode opposing the inner electrode.

The electrode active material used for the negative electrode or the positive electrode is as described above.

Also, for the separation layer 140 of the present disclosure, an electrolyte layer or a separator may be used.

The electrolyte layer which acts as an ion channel may include a gel-type polymer electrolyte using PEO, PVdF, PVdF-HFP, PMMA, PAN or PVAc; or a solid electrolyte using PEO, polypropylene oxide (PPO), polyethylene imine (PEI), polyethylene sulphide (PES) or polyvinyl acetate (PVAc). The matrix of the solid electrolyte preferably comprises a polymer or a ceramic glass as the backbone. In the case of typical polymer electrolytes, ions move very slowly in terms of a reaction rate, even when the ionic conductivity is satisfied. Thus, using the gel-type polymer electrolyte allowing easy movement of ions is preferable to using the solid electrolyte. The gel-type polymer electrolyte has poor mechanical properties, and to improve the poor mechanical properties, a support may be included, and for the support, a porous support or a cross-linked polymer may be used. The electrolyte layer of the present disclosure can serve as a separator, and thus the use of a separate separator may be eliminated.

The electrolyte layer of the present disclosure may further include a lithium salt. The lithium salt can improve the ionic conductivity and the reaction rate, and its non-limiting example includes LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate and lithium tetraphenylborate.

The separator is not limited to a particular type, but may include a porous polymer substrate made of a polyolefin-based polymer selected from the group consisting of ethylene homopolymer, propylene homopolymer, ethylene-butene copolymer, ethylene-hexene copolymer, and ethylene-methacrylate copolymer; a porous polymer substrate made of a polymer selected from the group consisting of polyester, polyacetal, polyamide, polycarbonate, polyimide, polyether ether ketone, polyether sulfone, polyphenylene oxide, polyphenylene sulfide and polyethylene naphthalate; a porous substrate made of a mixture of inorganic particles and a binder polymer; or a separator having a porous coating layer formed of a mixture of inorganic particles and a binder polymer on at least one surface of the porous polymer substrate.

In this instance, the porous coating layer formed of a mixture of inorganic particles and a binder polymer has the inorganic particles adhered to each other by the binder polymer to maintain a bound state of the inorganic particles (namely, the binder polymer connects and immobilizes the inorganic particles), and the porous coating layer maintains a bound state with the porous polymer substrate by the binder polymer. The inorganic particles of the porous coating layer are present in such a closed packed or densely packed structure to bring them into substantial contact with each other, and interstitial volumes created by the contact of the inorganic particles become pores of the porous coating layer.

Particularly, in order for the lithium ions from the lithium ion supplying core to be easily transferred to the outer electrode, it is preferable to use a separator made of a non-woven fabric corresponding to a porous polymer substrate made of a polymer selected from the group consisting of polyester, polyacetal, polyamide, polycarbonate, polyimide, polyether ether ketone, polyether sulfone, polyphenylene oxide, polyphenylene sulfide and polyethylene naphthalate.

Also, the present disclosure includes a protective coating 190, and the protective coating as an insulator is formed on the outer surface of the outer current collector to protect the electrode from moisture in the air and an external impact. For the protective coating 190, a general polymer resin including a moisture barrier layer may be used. In this instance, for the moisture barrier layer, aluminum or liquid crystal polymer with good moisture barrier performance may be used, and the polymer resin includes PET, PVC, HDPE or epoxy resin.

On the other hand, a cable-type secondary battery including at least two inner electrodes according to another aspect of the present disclosure includes at least two inner electrodes arranged in parallel; a separation layer formed around the outer surfaces of the inner electrodes together to prevent a short circuit in electrodes; and an outer electrode formed such that it is spirally wound around the outer surface of the separation layer, wherein at least one of the inner electrode and the outer electrode is formed of the above-described electrode for a secondary battery of the present disclosure.

Further, a cable-type secondary battery including at least two inner electrodes according to still another aspect of the present disclosure includes at least two lithium ion supplying cores including an electrolyte; at least two inner electrodes arranged in parallel and formed around an outer surface of each lithium ion supplying core, and including a current collector and an electrode active material layer; a separation layer formed around the outer surfaces of the inner electrodes together to prevent a short circuit in electrodes; and an outer electrode formed such that it is spirally wound around the outer surface of the separation layer, and including a current collector and an electrode active material layer, wherein at least one of the inner electrode and the outer electrode is formed of the above-described electrode for a secondary battery of the present disclosure.

Figure 13:
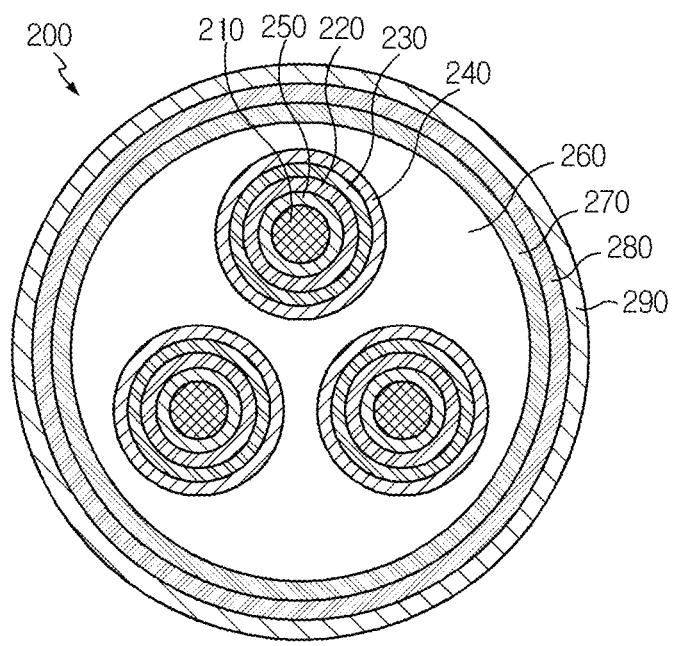
FIG. 13 is an outline cross-sectional view showing a cross section of a cable-type secondary battery with a plurality of inner electrodes according to an embodiment of the present disclosure

In the cable-type secondary battery including at least two inner electrodes, FIG. 13 shows a cable-type secondary battery 200 in which the above-described electrode for a secondary battery of the present disclosure is introduced to an inner electrode.

Referring to FIG. 13, the cable-type secondary battery 200 includes at least two lithium ion supplying cores 210 including an electrolyte; at least two inner electrodes arranged in parallel, and formed such that they are wound around the outer surfaces of each lithium ion supplying core 210; a separation layer 260 formed around the outer surfaces of the inner electrodes together to prevent a short circuit in electrodes; and an outer electrode formed such that it is spirally wound around the outer surface of the separation layer 260, and including an outer current collector 280 and an outer electrode active material layer 270, wherein the inner electrode includes an inner current collector 220, an inner electrode active material layer 230 formed on one surface of the inner current collector 220, a porous first support layer 240 formed on the upper surface of the inner electrode active material layer 230, and a second support layer 250 formed on the other surface of the inner current collector 220.

As described above, the outer electrode rather than the inner electrode may be the above-described sheet-type electrode for a secondary battery of the present disclosure, and both the inner electrode and the outer electrode may include the sheet-type electrode for a secondary battery of the present disclosure.

Because the cable-type secondary battery 200 has the inner electrode composed of a plurality of electrodes, a loading amount of electrode active material layers and the battery capacity may be easily controlled by adjusting the number of inner electrodes, and the presence of the plurality of electrodes may prevent a potential short circuit.

On the other hand, according to the present disclosure, there is provided a cable-type secondary battery including an inner electrode; and an outer electrode formed such that it is spirally wound around the outer surface of the inner electrode, wherein the outer electrode is the above-described electrode for a secondary battery of the present disclosure, and the porous first support layer prevents a short circuit in the inner electrode and the outer electrode.

Also, according to the present disclosure, there is provided a cable-type secondary battery including a lithium ion supplying core including an electrolyte; an inner electrode formed around the outer surface of the lithium ion supplying core; and an outer electrode formed such that it is spirally wound around the outer surface of the inner electrode, wherein at least one of the inner electrode and the outer electrode is the above-described electrode for a secondary battery of the present disclosure, and the porous first support layer prevents a short circuit in the inner electrode and the outer electrode.

The porous first support layer can serve as a separation layer to prevent a short circuit in the inner electrode and the outer electrode, eliminating the need for a separate separation layer. Thereby the electrode resistance can be reduced and the energy density per battery volume can be improved.

Hereinafter, the present disclosure is described in detail through embodiments or examples to particularly describe the present disclosure. However, modifications may be made in many different forms to the embodiments or examples according to the present disclosure, and the scope of the present disclosure should not be construed as being limited to the embodiments or examples described below. The embodiments or examples of the present disclosure are provided to enable those having ordinary skill in the art to understand the present disclosure fully and completely.

Example 1

(1) Manufacture of a Negative Electrode

A second support layer of a polyethylene film was formed on one surface of a sheet-type current collector made of copper by compression.

Subsequently, a negative electrode active material slurry with 70 wt. % graphite as a negative electrode active material, 5 wt. % denka black as a conductive material and 25 wt. % PVdF as a binder dispersed in an NMP solvent was prepared.

Subsequently, the negative electrode active material slurry was applied to the other surface of the current collector, a first support layer of a PET non-woven fabric was formed thereon, and a substrate with the second support layer, the current collector, the negative electrode active material slurry and the first support layer stacked in a sequential order was compressed to make a sheet-type electrode stacked body.

Subsequently, a sealing layer of polyvinylidene fluoride polymer was formed around the entire side surface of the sheet-type electrode stacked body, to manufacture a sheet-type negative electrode for a secondary battery.

(2) Fabrication of a Coin-Type Half Cell

An electrode assembly with a polyethylene separator interposed between the sheet-type negative electrode for a secondary battery manufactured in (1) of example 1 and a positive electrode of a lithium foil was made. The electrode assembly was put into a battery case, followed by injection of an electrolyte solution in which 1M $LiPF_6$ was added to a non-aqueous solvent including ethylene carbonate and diethyl carbonate mixed at a volume ratio of 1:2, to fabricate a coin-type half cell.

Comparative Example 1

(1) Manufacture of a Negative Electrode

A negative electrode active material slurry with 70 wt. % graphite as a negative electrode active material, 5 wt. % denka black as a conductive material and 25 wt. % PVdF as a binder dispersed in an NMP solvent was applied to one surface of a sheet-type current collector made of copper and dried to manufacture a negative electrode.

(2) Fabrication of a Coin-Type Half Cell

A coin-type half cell was fabricated by the same method as (2) of example 1 except that the sheet-type negative electrode manufactured in (1) of comparative example 1 was used.

Negative Electrode Bending Test

After the negative electrodes manufactured in example 1 and comparative example 1 were folded in half, their shape was observed.

Figure 14:
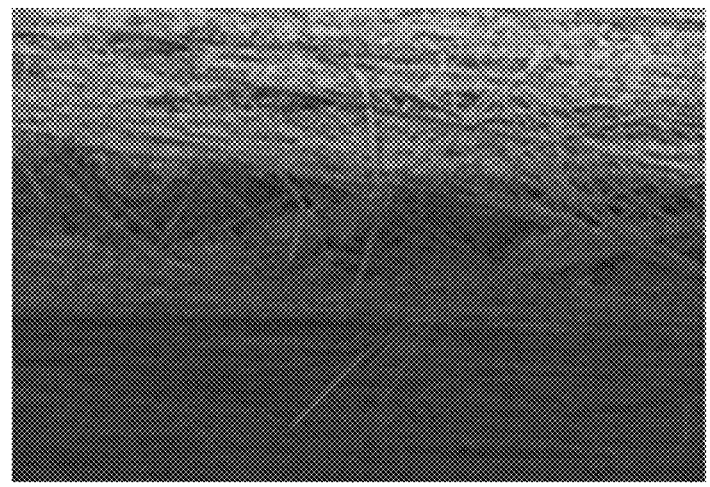
FIG. 14 is a SEM image showing a cross section of a sheet-type electrode manufactured according to an example of the present disclosure when folded in half.
Figure 15:
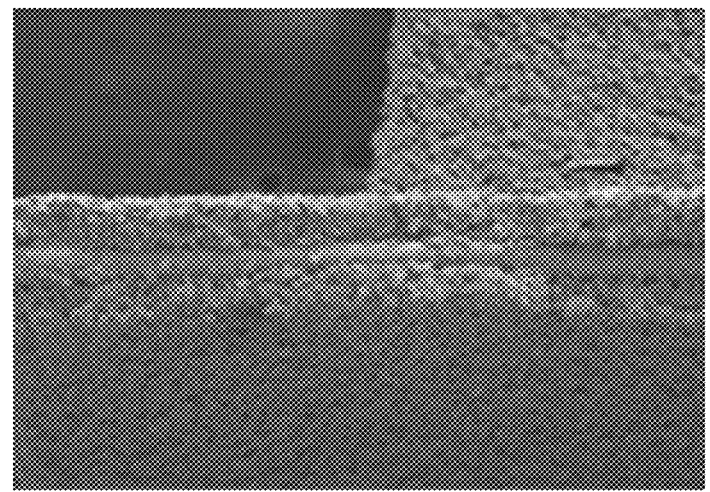
FIG. 15 is a SEM image showing a cross section of a sheet-type electrode manufactured according to a comparative example of the present disclosure when folded in half.

FIGS. 14 and 15 are SEM images showing the cross section of the sheet-type electrodes manufactured according to example 1 and comparative example 1 when folded in half.

In the case of comparative example, the electrode was broken, causing serious cracking. In the case of example, although cracking occurred, it was found that its severity was alleviated, and the first support layer or the PET non-woven fabric was fixing the electrode active material layer well. Through this, it can be seen that the flexibility of the negative electrode was greatly improved.

Charging/Discharging Characteristics Evaluation

Charging/discharging characteristics were evaluated using the coin-type half cells fabricated in example 1 and comparative example 1. In charging, charging was performed with constant current at the current density of 0.5 C up to 5 mV, the voltage was uniformly maintained at 5 mV with constant voltage, and charging was terminated when the current density reached 0.005 C. In discharging, discharging was completed in a constant current mode at the current density of 0.5 C to 1.5 V. Charging/discharging was repeatedly performed for 25 cycles under the same conditions.

Figure 16:
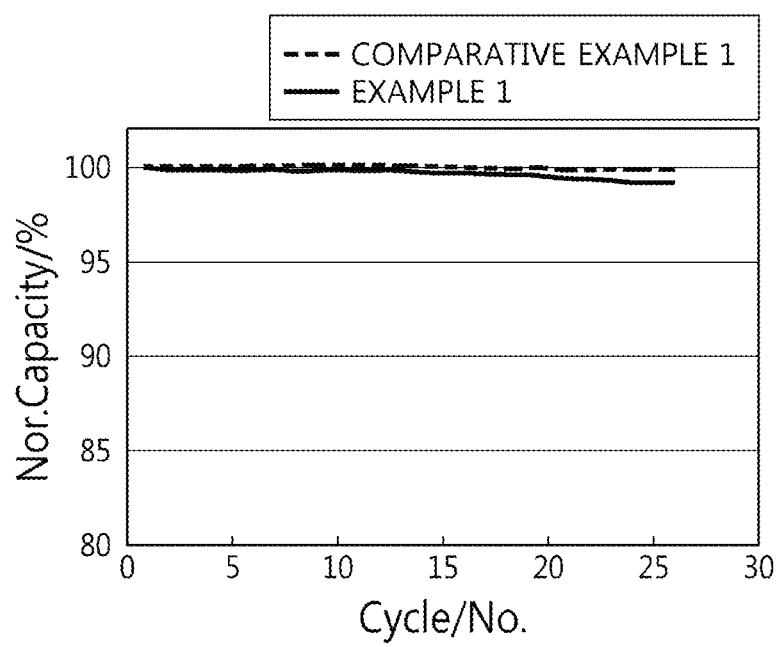
FIG. 16 is a graph showing life characteristics of coin-type half cells including electrodes manufactured according to an example and a comparative example of the present disclosure.

FIG. 16 shows life characteristics of the coin-type half cells according to example 1 and comparative example 1. When compared to comparative example 1, example 1 has about 1% reduction in life characteristics, but shows almost similar cell performance Through this, it can be seen that the flexibility of the electrode can be greatly improved through introduction of the first support layer and the second support layer.

Example 2

(1) Manufacture of a Positive Electrode

A second support layer of a polyethylene film was formed on one surface of a sheet-type current collector of an aluminum foil by compression.

Subsequently, a positive electrode active material slurry with 80 wt. % $LiCoO_2$ as a positive electrode active material, 5 wt. % denka black as a conductive material and 15 wt. % PVdF as a binder dispersed in an NMP solvent was coated on the other surface of the sheet-type current collector, and dried to form a positive electrode active material layer.

Subsequently, a conductive material slurry including denka black and PVdF mixed at a weight ratio of 40:60 was applied to the upper surface of the positive electrode active material layer, a first support layer of a PET non-woven fabric was formed thereon, and a substrate with the second support layer, the current collector, the positive electrode active material layer, the conductive material slurry and the first support layer stacked in a sequential order was compressed to make a sheet-type electrode stacked body.

Subsequently, a sealing layer of polyvinylidene fluoride polymer was formed around the entire side surface of the sheet-type electrode stacked body to manufacture a sheet-type positive electrode for a secondary battery.

(2) Fabrication of a Coin-Type Half Cell

An electrode assembly with a polyethylene separator interposed between the sheet-type positive electrode for a secondary battery manufactured in (1) of example 2 and a negative electrode of a lithium foil was made. The electrode assembly was put into a battery case, followed by injection of an electrolyte solution in which 1M $LiPF_6$ was added to a non-aqueous solvent including ethylene carbonate and diethyl carbonate mixed at a volume ratio of 1:2, to fabricate a coin-type half cell.

Comparative Example 2

(1) Manufacture of a Positive Electrode

A positive electrode active material slurry with 80 wt. % $LiCoO_2$ as a positive electrode active material, 5 wt. % denka black as a conductive material and 15 wt. % PVdF as a binder dispersed in an NMP solvent was applied to one surface of a sheet-type current collector of an aluminum foil and dried to manufacture a positive electrode.

(2) Fabrication of a Coin-Type Half Cell

A coin-type half cell was fabricated by the same method as (2) of example 2 except that the positive electrode manufactured in (1) of comparative example 2 was used.

Comparative Example 3

(1) Manufacture of a Positive Electrode

A positive electrode was manufactured by the same method as (1) of example 2 except that a slurry including PVdF binder alone was used instead of the conductive material slurry including denka black.

(2) Fabrication of a Coin-Type Half Cell

A coin-type half cell was fabricated by the same method as (2) of example 2 except that the positive electrode manufactured in (1) of comparative example 3 was used.

Electrode Bending Test

After the positive electrodes manufactured in example 2 and comparative example 2 were folded in half, their shape was observed.

Figure 17:
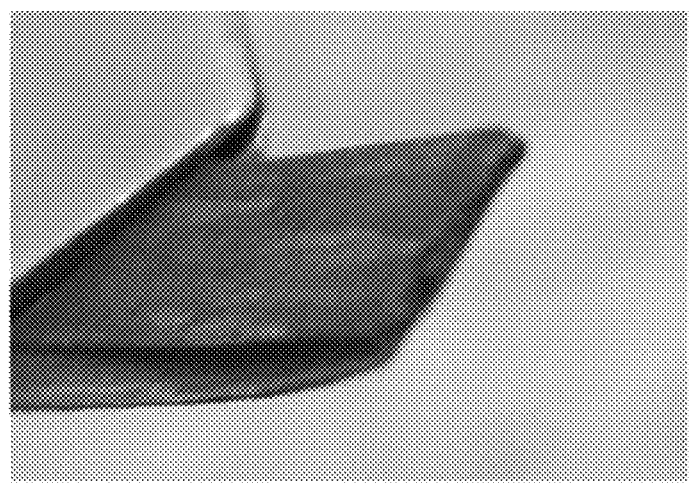
FIG. 17 is a photographic image showing a sheet-type electrode manufactured according to an example of the present disclosure when folded in half.
Figure 18:
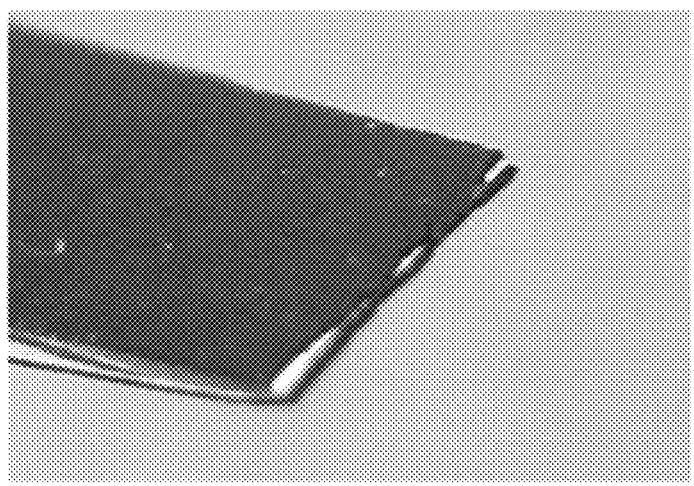
FIG. 18 is a photographic image showing a sheet-type electrode manufactured according to a comparative example of the present disclosure when folded in half.

FIGS. 17 and 18 are each photographic images showing the sheet-type electrodes manufactured according to example and comparative example when folded in half.

In the case of comparative example 2, the electrode was broken, causing serious cracking, while in the case of example 2, it was found that cracking did not occur, and the first support layer or the PET non-woven fabric was fixing the electrode active material layer well. Through this, it can be seen that the flexibility of the electrode was greatly improved.

Charging/Discharging Characteristics Evaluation

Charging/discharging characteristics were evaluated using the coin-type half cells fabricated in example 2 and comparative examples 2 and 3. In charging, charging was performed with constant current at the current density of 0.5 C up to 4.25 V, the voltage was uniformly maintained at 4.25 V with constant voltage, and charging was terminated when the current density reached 0.005 C. In discharging, discharging was completed in a constant current mode at the current density of 0.5 C to 3.0 V. Charging/discharging was repeatedly performed for 20 cycles under the same conditions.

Figure 19:
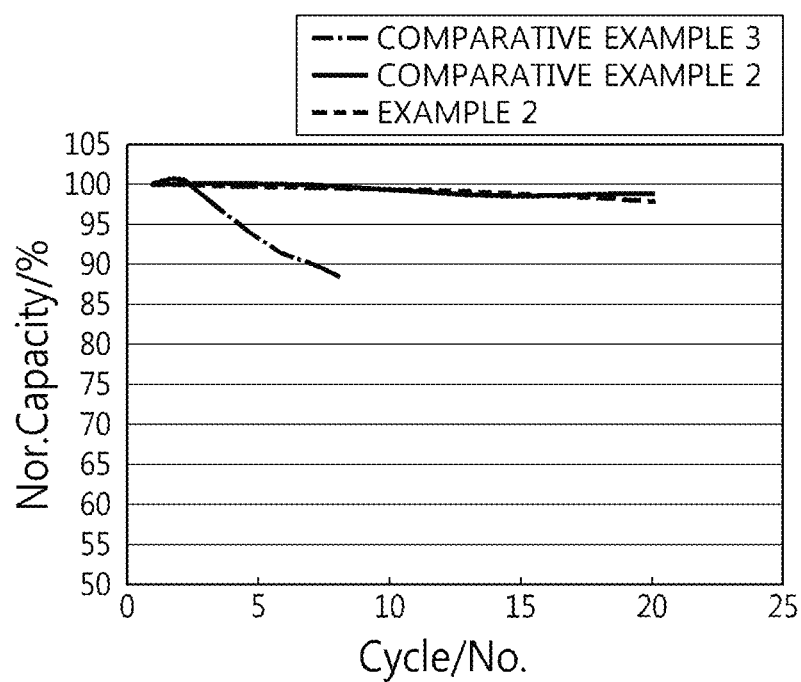
FIG. 19 is a graph showing life characteristics of coin-type half cells including electrodes manufactured according to an example and a comparative example of the present disclosure.

FIG. 19 shows life characteristics of the half cells according to example 2 and comparative examples 2 and 3. When compared to comparative example 2, example 2 shows almost similar life characteristics, while comparative example 3 has very poor cell performance. In the case of comparative example 3, because it does not include the conductive material, pores were not created, making permeation of an electrolyte solution into the electrode active material layer difficult, which acts as resistance in the end, causing the cell performance to degrade.

On the other hand, the embodiments of the present disclosure disclosed in the specification and the drawings just present a particular example to assist the understanding, but are not intended to limit the scope of the present disclosure. It is obvious to those skilled in the art that variations other than the disclosed embodiments may be made based on the technical aspects of the present disclosure.

What is claimed is:

1. A sheet-type electrode for a flexible cable-type secondary battery, comprising:
    a sheet-type electrode stacked body comprising a current collector, an electrode active material layer formed on one surface of the current collector, and a porous first support layer formed on the electrode active material layer, and a second support layer formed directly on the other surface of the current collector; and
    a sealing layer formed around an entire side surface of the electrode stacked body, except top and bottom surfaces of the electrode stacked body,
    wherein the sheet-type electrode is configured to spirally wound to form the flexible cable-type secondary battery,
    wherein the porous first support layer is a mesh-type porous membrane or a non-woven fabric,
    wherein the porous first support layer and the porous second support layer are formed of any one selected from the group consisting of high-density polyethylene, low-density polyethylene, linear low-density polyethylene, ultra-high molecular weight polyethylene, polypropylene polyethyleneterephthalate, polybutyleneterephthalate, polyester, polyacetal, polyamide, polycarbonate, polyimide, polyether ether ketone, polyether sulfone, polyphenylene oxide, polyphenylene sulfide, polyethylenenaphthalate, and mixtures thereof,
    the sealing layer is formed of a polymer including at least one selected from the group consisting of high-density polyethylene, linear low-density polyethylene, low-density polyethylene, ultra-high molecular weight polyethylene, polypropylene, polybutylene, polypentene, polyethylene terephthalate, polybutylene terephthalate, polyester, polyacetal, polyamide, polycarbonate, polyimide, polyether ether ketone, polyether sulfone, polyphenylene oxide, polyphenylene sulfide, polyvinylidene fluoride, polyvinylidene fluoride-co-hexafluoro propylene, polyvinylidene fluoride-co-trichloroethylene, polybutyl acrylate, polymethyl methacrylate, polyacrylonitrile and polyethylene naphthalate.

2. The electrode according to claim 1, further comprising:
    a conductive layer between the electrode active material layer and the porous first support layer, the conductive layer comprising a conductive material and a binder.

3. The electrode according to claim 1, further comprising:
    an organic-inorganic porous layer between the electrode active material layer and the porous first support layer, the organic-inorganic porous layer comprising inorganic particles and a binder polymer.

4. The electrode for a secondary battery according to claim 1, further comprising:
    a porous polymer layer between the electrode active material layer and the porous first support layer.

5. The electrode according to claim 1, further comprising:
    a conductive material coating layer on the porous first support layer, the conductive material coating layer comprising a conductive material and a binder.

6. The electrode according to claim 1, further comprising:
    a porous coating layer on the porous first support layer, the porous coating layer formed of a mixture of inorganic particles and a binder polymer.

7. The electrode according to claim 1, wherein the sheet-type electrode has a strip structure extending in one direction.

8. A cable-type secondary battery comprising:
    an inner electrode;
    a separation layer formed around an outer surface of the inner electrode to prevent a short circuit in electrodes; and
    an outer electrode formed such that it is spirally wound around an outer surface of the separation layer,
    wherein at least one of the inner electrode and the outer electrode is formed of the electrode of claim 1.

9. The cable-type secondary battery according to claim 8, wherein the outer electrode has a strip structure extending in one direction.

10. The cable-type secondary battery according to claim 8, wherein the outer electrode is formed such that it is spirally wound in non-overlapping turns.

11. The cable-type secondary battery according to claim 8, wherein the outer electrode is formed such that it is spirally wound in overlapping turns.

12. The cable-type secondary battery according to claim 8, wherein the inner electrode has a hollow structure in which a space is formed inside.

13. The cable-type secondary battery according to claim 12, wherein the inner electrode comprises at least one electrode wound spirally.

14. The cable-type secondary battery according to claim 12, wherein an inner electrode current collector core, a lithium ion supplying core comprising an electrolyte, or a filling core is formed in the space formed within the inner electrode.

15. The cable-type secondary battery according to claim 8, wherein the inner electrode is a negative electrode or a positive electrode, and the outer electrode is a positive electrode or a negative electrode opposing the inner electrode.

16. The cable-type secondary battery according to claim 8, wherein the separation layer is an electrolyte layer or a separator.

17. The cable-type secondary battery according to claim 8, further comprising:
    a protective coating formed around an outer surface of the outer electrode.

18. A cable-type secondary battery comprising:
    an inner electrode; and
    an outer electrode formed such that it is spirally wound around an outer surface of the inner electrode,
    wherein the outer electrode is the electrode of claim 1, and the porous first support layer prevents a short circuit in the inner electrode and the outer electrode.

* * * * *